(12) United States Patent
Yim et al.

(10) Patent No.: US 8,093,810 B2
(45) Date of Patent: Jan. 10, 2012

(54) PLASMA DISPLAY DEVICE

(75) Inventors: Sang-Hoon Yim, Suwon-si (KR);
Chun-Gyoo Lee, Suwon-si (KR);
Jong-Han Rhee, Suwon-si (KR);
Yu-Jeong Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 182 days.

(21) Appl. No.: 12/378,345

(22) Filed: Feb. 12, 2009

(65) Prior Publication Data

US 2009/0212702 A1  Aug. 27, 2009

(30) Foreign Application Priority Data

Feb. 25, 2008 (KR) .................. 10-2008-0016713

(51) Int. Cl.
*G06F 3/41* (2006.01)
(52) U.S. Cl. ........................ 313/582; 345/173
(58) Field of Classification Search .......... 313/582–587; 315/169.5; 345/175, 173
See application file for complete search history.

(56) References Cited

U.S. PATENT DOCUMENTS

| | | | | |
|---|---|---|---|---|
| 3,775,560 | A | | 11/1973 | Ebeling et al. |
| 4,782,328 | A | * | 11/1988 | Denlinger ........................ 341/5 |
| 2003/0214498 | A1 | * | 11/2003 | Gothard ........................ 345/204 |
| 2004/0149892 | A1 | * | 8/2004 | Akitt et al. .................... 250/221 |
| 2005/0035336 | A1 | * | 2/2005 | Kuwabara ...................... 252/587 |
| 2006/0022962 | A1 | * | 2/2006 | Morrison et al. ............. 345/175 |
| 2006/0279548 | A1 | * | 12/2006 | Geaghan ........................ 345/173 |

FOREIGN PATENT DOCUMENTS

| | | |
|---|---|---|
| EP | 1780697 A2 | 5/2007 |
| EP | 2 093 652 A2 | 8/2009 |
| JP | 5-160702 | 6/1993 |
| JP | 9-91088 | 4/1997 |
| JP | 9-171173 | 6/1997 |
| JP | 2000-010493 | 1/2000 |
| JP | 2000-98131 | 4/2000 |
| JP | 2001-84058 | 3/2001 |
| JP | 2001-147776 | 5/2001 |
| JP | 2001-175416 | 6/2001 |
| JP | 2002-116428 | 4/2002 |

(Continued)

OTHER PUBLICATIONS

Search Report dated Mar. 30, 2010 of the corresponding European Patent Application No. 09250500.7.

(Continued)

*Primary Examiner* — Nimeshkumar Patel
*Assistant Examiner* — Christopher Raabe
(74) *Attorney, Agent, or Firm* — Christie, Parker & Hale, LLP

(57) ABSTRACT

A plasma display device embodying a touch panel function utilizing infrared rays that are generated when displaying an image and that are emitted in a uniform distribution manner in a display area. The plasma display device includes: a plasma display panel (PDP) for displaying an image; a chassis base attached to and supporting the PDP; an infrared ray sensor at a front surface or a rear surface of the PDP for detecting a change in amount of infrared rays emitted from the PDP; and a controller for receiving a detection signal and determining a position of the change in amount of infrared rays, the position of the change in amount of infrared rays defining a touch position.

25 Claims, 11 Drawing Sheets
(2 of 11 Drawing Sheet(s) Filed in Color)

FOREIGN PATENT DOCUMENTS

| | | |
|---|---|---|
| JP | 2002-519725 | 7/2002 |
| JP | 2003-99205 | 4/2003 |
| JP | 2006-103364 | 4/2006 |
| JP | 2007-271773 | 10/2007 |
| JP | 2007-316925 | 12/2007 |
| KR | 10-2007-0020431 | 2/2007 |
| KR | 10-2007-0024969 A | 3/2007 |
| KR | 10-2007-0082958 A | 8/2007 |
| WO | WO 99/39224 | 8/1999 |
| WO | WO 2007/111329 A1 | 10/2007 |

OTHER PUBLICATIONS

Notice of decision to grant a patent dated Apr. 12, 2010 of the priority application (Korean Patent Application No. 10-2008-0016713).

Office Action dated Feb. 9, 2010 of the corresponding Japanese Patent Application No. 2008-219482.

European Search Report dated Sep. 16, 2010 for European Patent application 09177239.2.

SIPO Office action dated Nov. 12, 2010, for corresponding Chinese Patent application 200910004440.3, with English translation, noting references previously filed in an IDS dated Jun. 22, 2010.

SIPO Office action dated Apr. 26, 2011, for corresponding Chinese Patent application 200910004440.3, noting references previously submitted in an IDS dated Jun. 22, 2010.

\* cited by examiner

PLASMA DISPLAY DEVICE

CROSS-REFERENCE TO RELATED APPLICATION

This application claims priority to and the benefit of Korean Patent Application No. 10-2008-0016713, filed in the Korean Intellectual Property Office on Feb. 25, 2008, the entire content of which is incorporated herein by reference.

BACKGROUND OF THE INVENTION

1. Field of the Invention

The present invention relates to a plasma display device. More particularly, the present invention relates to a plasma display device that embodies a touch panel function utilizing infrared rays that are emitted from a panel.

2. Description of the Related Art

In general, a plasma display device is a device that displays an image in a plasma display panel (PDP) using plasma that is generated by a gas discharge.

The PDP excites phosphors using vacuum ultra-violet (VUV) rays that are radiated from plasma, and is a display element that displays an image by visible red (R), green (G), and blue (B) lights that are generated while the phosphor is stabilizing.

As an example, an alternating current (AC) type of PDP includes a front substrate, a rear substrate, and address electrodes and display electrodes that are provided between the front and rear substrates to generate a gas discharge.

A plasma display device includes a chassis base that is attached to and supports a PDP, and a plurality of printed circuit board assemblies (PBA) that drive address electrodes and display electrodes.

The PDP displays an image by emitting visible light, and simultaneously emits infrared rays. The infrared rays are emitted in a uniform distribution manner from a display area (or display region) that displays the image. The PDP generally has an infrared ray shield filter at a front substrate to shield infrared rays.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of an embodiment of the present invention is directed toward a plasma display device embodying a touch panel function utilizing infrared rays that are generated when displaying an image and that are emitted in a uniform distribution manner in a display area of the display device.

According to one embodiment of the present invention, a plasma display device includes: a PDP for displaying an image; a chassis base attached to and supporting the PDP; an infrared ray sensor at a front surface or a rear surface of the PDP for detecting a change in amount of infrared rays emitted from the PDP; and a controller for receiving a detection signal and determining a position of the change in amount of infrared rays, the position of the change in amount of infrared rays defining a touch position.

The infrared ray sensor may include a front infrared ray sensor at the front surface of the PDP.

The PDP may include a display area for displaying the image and a non-display area at a periphery of the display area. The front infrared ray sensor may include a first front infrared ray sensor, a second front infrared ray sensor, a third front infrared ray sensor, and a fourth front infrared ray sensor in the non-display area corresponding to each of four corners of a quadrangle of the display area.

The infrared ray sensor may include a rear infrared ray sensor at the rear surface of the PDP.

The PDP may include a display area for displaying the image, and a non-display area at a periphery of the display area. The rear infrared ray sensor may include a first rear infrared ray sensor, a second rear infrared ray sensor, a third rear infrared ray sensor, and a fourth rear infrared ray sensor in the non-display area corresponding to each of four corners of a quadrangle of the display area.

The plasma display device may further include a PBA at a rear surface of the chassis base and electrically coupled to the PDP, wherein the PBA includes the controller.

The PDP may include a pair of longitudinal sides opposite each other and a pair of lateral sides orthogonal to the longitudinal sides and opposite each other. The chassis base may include a first horizontal member attached to the PDP and facing the pair of longitudinal sides and the pair of lateral sides, a vertical member attached to the first horizontal member and extending away from the PDP, and a second horizontal member attached to the vertical member and substantially parallel to the first horizontal member.

The first horizontal member may be a frame having a quadrangular shape corresponding to the pair of longitudinal sides and the pair of lateral sides.

The PDP may further include a double-sided adhesive tape between the PDP and the first horizontal member.

The vertical member may include a vent hole for venting air from a space between the rear surface of the PDP and the second horizontal member.

According to another embodiment of the present invention, a plasma display device includes: a PDP for displaying an image; a chassis base attached to and supporting the PDP; an infrared ray camera at a front surface or a rear surface of the PDP for photographing a change in amount of infrared rays emitted from the PDP; and a controller or a PBA for receiving a photograph signal and determining a position of the change in amount of infrared rays, the position of the change in amount of infrared rays defining a touch position.

The infrared ray camera may be at the front surface of the PDP, and infrared rays emitted from the front surface of the PDP may have a wavelength range from about 800 nm to about 1000 nm.

The infrared ray camera may be at the rear surface of the PDP, and the infrared rays may be reflected from the front surface of the PDP to the rear surface and have a wavelength range from about 800 nm to about 1000 nm when they are emitted from the rear surface.

The PDP may include a display area for displaying the image, and a non-display area at a periphery of the display area, wherein the infrared ray camera includes a first infrared ray camera, a second infrared ray camera, a third infrared ray camera, and a fourth infrared ray camera in the non-display area corresponding to each of four corners of a quadrangle of the display area.

The first, second, third, and a fourth infrared ray cameras may have a first detection area, a second detection area, a third detection area, and a fourth detection area, respectively, each of the detection areas occupying at least one quarter of the display area at each of the corners. At least one of the first, second, third, and fourth detection areas may overlap another of the first, second, third, and fourth detection areas.

The first, second, third, and fourth infrared ray cameras may detect a change in amount of infrared rays emitted from the PDP corresponding to the first, second, third, and fourth detection areas, respectively.

According to yet another embodiment of the present invention, a plasma display device includes: a PDP for displaying an image; a chassis base attached to and supporting the PDP; a detector at a front surface, a rear surface, or a side surface of the PDP for detecting a change in amount of infrared rays emitted from the PDP; and a controller for receiving a detection signal from the detector and determining a position of the change in amount of infrared rays, the position of the change in amount of infrared rays defining a touch position.

The detector may include at least one of an infrared ray sensor or an infrared ray camera. The at least one of an infrared ray sensor or an infrared ray camera may include a feedback loop that re-detects infrared rays that are emitted from the PDP.

The detector may include at least two detectors for determining the position using two intersecting shafts.

The plasma display device may further include an infrared ray passage filter for transmitting a wavelength range from about 800 nm to about 1000 nm of infrared rays emitted from the PDP.

The plasma display device may further include a light receiving sensor for detecting infrared rays radiated from a remote control controlling the PDP, and a light receiving sensor filter for transmitting a wavelength range from about 900 nm to about 950 nm of infrared rays radiated from the remote control and for shielding other wavelength ranges among a wavelength range from about 800 nm to about 1000 nm of the infrared rays.

The plasma display device may further include a front case covering a side of the PDP and a rear case covering a side of the chassis base, the front case and the rear case coupled to each other, wherein the light receiving sensor may be at the inside of the front case at an outer region of the PDP, and the light receiving sensor filter may be at the front of the light receiving sensor.

The light receiving sensor filter may be a phosphate glass filter including dihydric copper ions, a filter including a thin layer of metal on a glass surface, or a filter including a resin having a pigment.

BRIEF DESCRIPTION OF THE DRAWINGS

The accompanying drawings, together with the specification, illustrate exemplary embodiments of the present invention, and, together with the description, serve to explain the principles of the present invention.

The patent or application file contains at least one drawing/picture executed in color. Copies of this patent or patent application publication with color drawing/picture(s) will be provided by the Office upon request and payment of the necessary fee.

DETAILED DESCRIPTION

Figure 1:
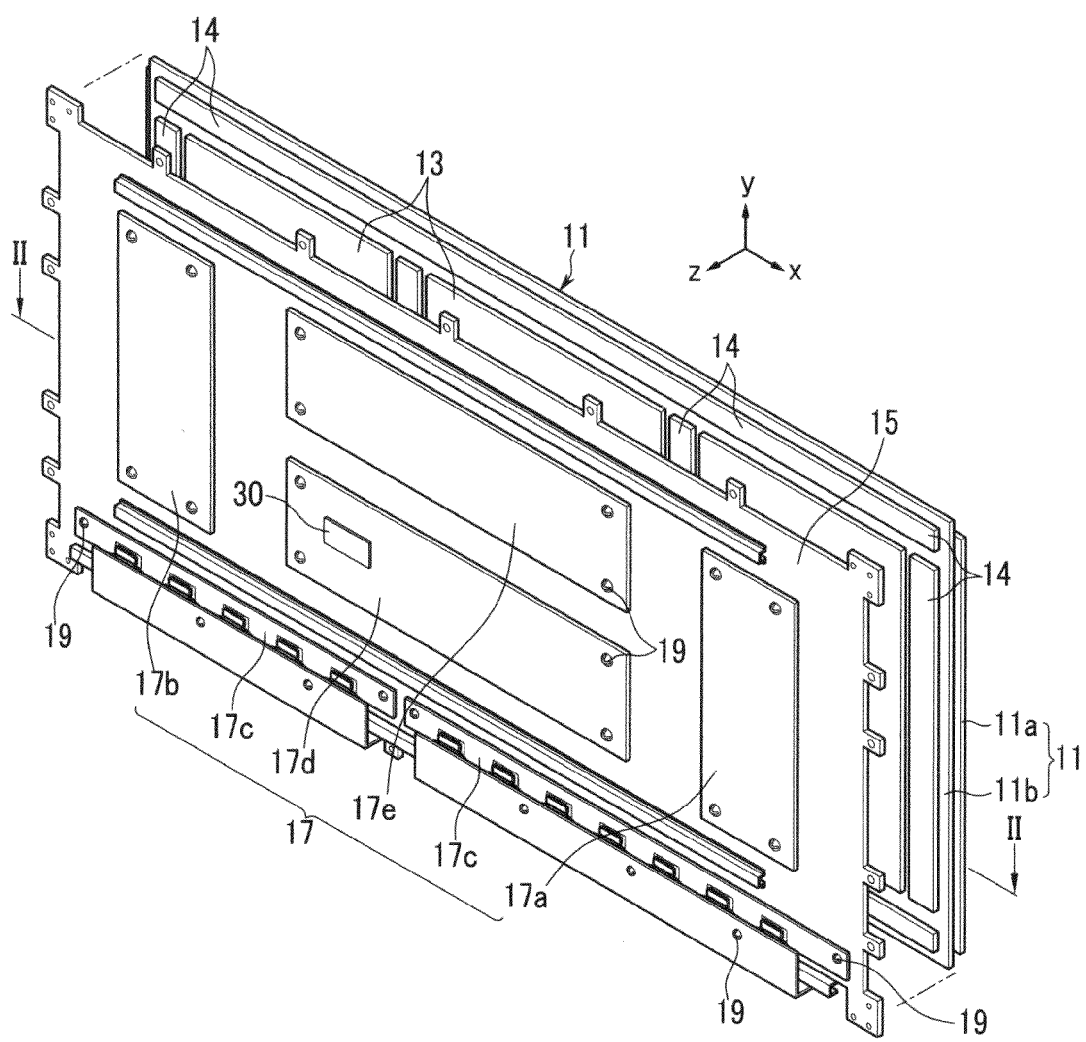
FIG. 1 is an exploded perspective schematic view of a plasma display device according to an embodiment of the present invention.

The present invention will be described more fully hereinafter with reference to the accompanying drawings, in which embodiments of the invention are shown. As those skilled in the art would realize, the described embodiments may be modified in various ways without departing from the spirit or scope of the present invention. The drawings and description are to be regarded as illustrative in nature and not restrictive. Like reference numerals designate like elements throughout the specification.

FIG. 1 is an exploded perspective schematic view of a plasma display device according to one embodiment of the present invention.

Referring to FIG. 1, the plasma display device includes a PDP 11, heat dissipation sheets 13, a chassis base 15, and PBAs 17.

The PDP 11 includes a front substrate 11a and a rear substrate 11b, and displays an image by a gas discharge generated between the front and rear substrates 11a and 11b. A general configuration and function of a PDP are well known in the art.

The plasma display device of FIG. 1 determines a touch position using a change in amount of infrared rays according to whether it is touched or not, and is described herein. A detailed description regarding general constituent elements of a PDP, as known in the art, is omitted.

Figure 2:
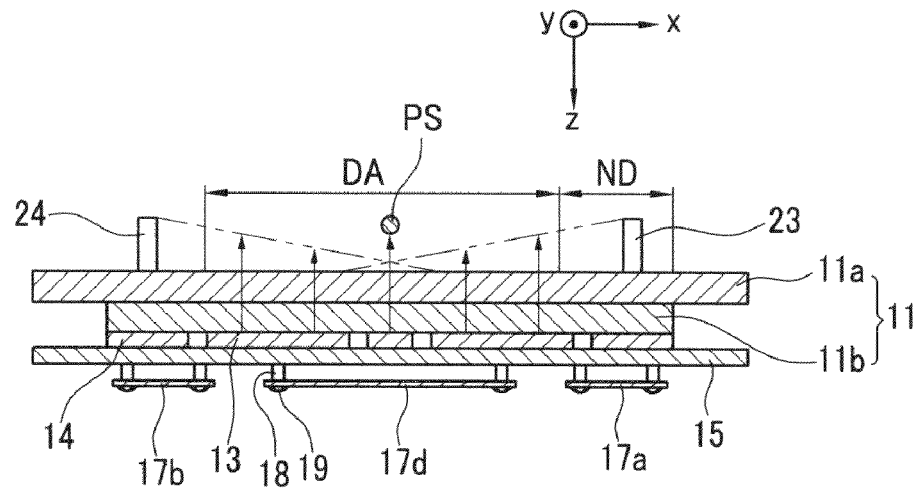
FIG. 2 is a cross-sectional schematic view of the plasma display device taken along line II-II of FIG. 1.

FIG. 2 is a cross-sectional schematic view of the plasma display device of FIG. 1.

Referring to FIG. 2, the chassis base 15 is attached to a rear surface of the PDP 11 by a double-sided adhesive tape 14 to support the PDP 11. By adhesive strength of the double-sided adhesive tape 14, the heat dissipation sheets 13 are positioned between the PDP 11 and the chassis base 15.

The PBAs 17 are mounted at a rear surface of the chassis base 15 to be electrically connected to the PDP 11. The PBAs 17 are placed on a plurality of bosses 18 on the chassis base 15 and fixed by setscrews 19 that are fastened to the bosses 18.

The PBAs 17 include a sustain electrode driving board 17a that controls a sustain electrode, a scan electrode driving board 17b that controls a scan electrode, and an address buffer board 17c that controls an address electrode.

Further, the PBAs 17 include a logic board 17d that receives an outside image signal to generate control signals necessary for driving the address electrode, the sustain electrode, and the scan electrode, and that applies the control signals to the corresponding PBAs. The PBAs 17 also include a power supply board 17e that supplies power necessary for driving each of the PBAs 17a, 17b, 17c, and 17d.

According to the driving of the PBAs 17, the PDP 11 displays an image.

Figure 3:
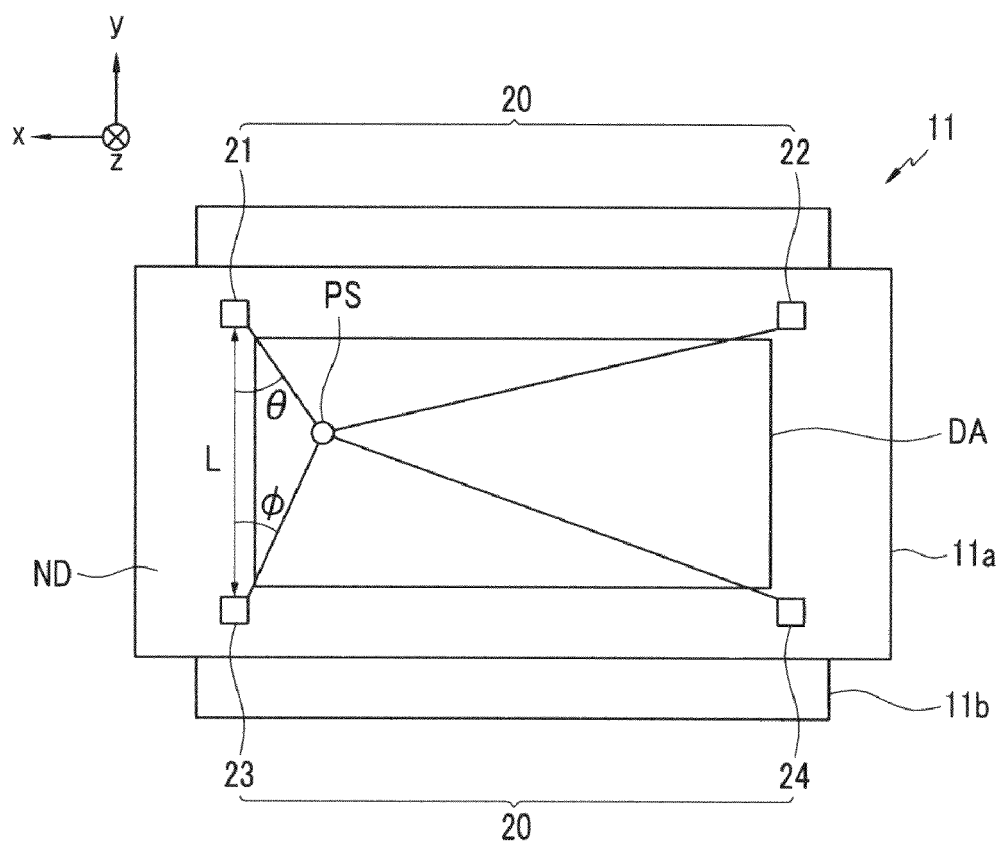
FIG. 3 is a front schematic view of a PDP of the plasma display device of FIG. 1.

FIG. 3 is a front schematic view of the PDP 11.

Referring to FIG. 3, the PDP 11 is divided into a display area DA that displays an image, and a non-display area ND that does not display an image. The non-display area ND is at the periphery of the display area DA.

The display area DA emits infrared rays from a front surface thereof in a uniform distribution manner while displaying an image (see FIG. 2). Although some infrared rays are emitted to the non-display area ND, because they are unrelated to the present invention, they are ignored.

Figure 4:
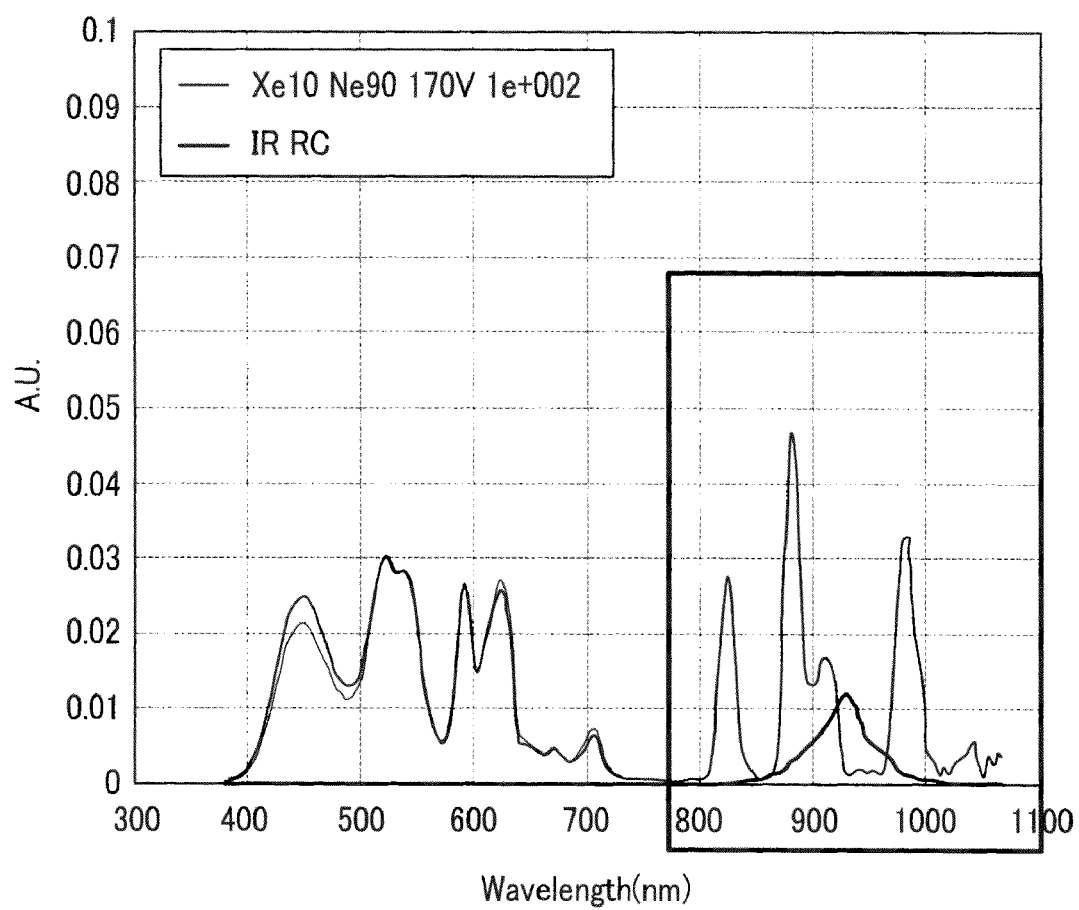
FIG. 4 is a graph illustrating a light emitting spectrum of the PDP of the plasma display device of FIG. 1.

FIG. 4 is a graph illustrating a light emitting spectrum of the PDP 11.

Referring to FIG. 4, the PDP 11 emits infrared rays having a wavelength range of 800-1000 nm from a front surface of the display area DA. The wavelength range of 800-1000 nm of the infrared rays is overlapped with that of infrared rays that are used for infrared-ray communication of a television remote control.

Therefore, the PDP generally shields infrared rays that are emitted from the front surface of the display area DA using an infrared ray shield filter.

However, about 85% of infrared rays that are emitted from the display area DA are shielded by the infrared ray shield filter, and the remaining 15% of infrared rays transmit through the infrared ray shield filter. Therefore, the present exemplary embodiment can be applied even in a case of using the infrared ray shield filter.

Figure 5:
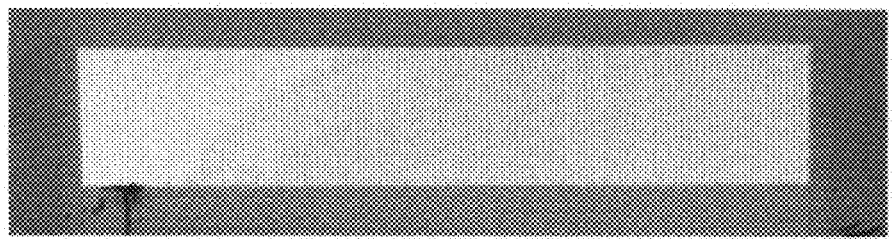
FIG. 5 is a picture illustrating visible light and infrared rays that are emitted from a front side of the PDP of the plasma display device of FIG. 1.

FIG. 5 is a picture illustrating visible light and infrared rays that are emitted from the front side of the PDP 11.

Referring to FIG. 5, when the infrared ray shield filter is removed, it is determined that both infrared rays and visible light are emitted (the bright portion of the center) from the display area DA of the PDP 11.

Figure 6:
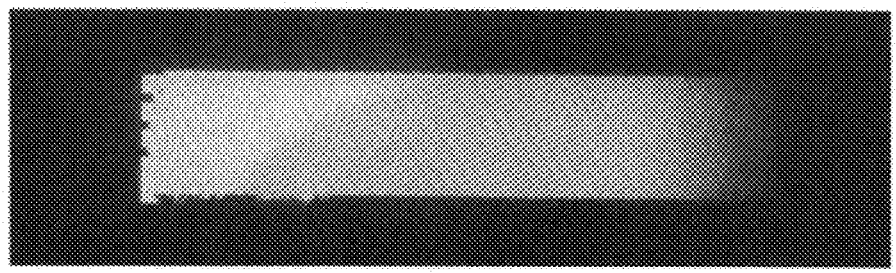
FIG. 6 is a picture illustrating infrared rays that are emitted from the front side of the PDP of the plasma display device of FIG. 1.

FIG. 6 is a picture illustrating infrared rays that are emitted from the front side of the PDP 11.

FIG. 6 shows an infrared ray passage filter IF (see FIG. 13) at the front of the display area DA, and records an infrared ray wavelength range of FIG. 4. The infrared ray passage filter IF transmits infrared rays of a wavelength range of 800-1000 nm and shields infrared rays of other wavelength ranges among infrared rays that are emitted from the PDP 11.

Referring to FIG. 6, it can be seen that the transmitted infrared rays are emitted (a bright portion of the center) in a uniform distribution manner from a front surface of the display area DA.

Infrared rays are emitted in a uniform distribution manner from the front surface of the display area DA and collide with a physical solid PS (see FIG. 2) at the front of the display area DA. In this case, the amount of infrared rays is changed at the collision position. When the change in amount of infrared rays is detected, a touch position of the physical solid PS on the display area DA can be detected.

Referring again to FIG. 3, in order to detect a change in amount of infrared rays that are emitted from the display area DA, the PDP 11 includes a front infrared ray sensor 20.

The front infrared ray sensor 20 is at the front of the PDP 11. The front infrared ray sensor 20 detects a change in amount of infrared rays that are emitted from the front surface of the display area DA and that are generated by colliding with the physical solid PS at the front of the display area DA.

In order to detect the change in amount of infrared rays that are emitted from the PDP 11, the front infrared ray sensor 20 has a feedback loop that continues to re-detect infrared rays. The feedback loop can be variously embodied by a designer and therefore a detailed description thereof is omitted.

Specifically, the front infrared ray sensor 20 is attached to a front surface of the PDP 11. When the plasma display device is completed by including the PDP 11, because a front case and a rear case are provided at a front surface and a rear surface, respectively, of the PDP 11, the front infrared ray sensor 20 may be attached to the front case.

If the front infrared ray sensor 20 can detect a change in amount of infrared rays that are emitted from the display area DA, the front infrared ray sensor 20 can be attached to either one of the PDP 11 and the front case. The quantity of the front infrared ray sensors 20 may be at least two, but in the embodiment shown in FIG. 3, the quantity of the front infrared ray sensors 20 is four.

For example, the front infrared ray sensor 20 may include at least two sensors in order to determine a touch position with two shafts that are opposite to each other or intersect each other. Each shaft is aligned to a line connecting one sensor and the touch position. In this case, two detection shafts that are formed by the front infrared ray sensor 20 can be opposite to each other in a straight line and intersect each other in a plane. A point that is determined when the two detection shafts that are opposite to each other or that intersect each other becomes a touch position.

Referring to FIG. 3, the front infrared ray sensor 20 includes a first front infrared ray sensor 21, a second front infrared ray sensor 22, a third front infrared ray sensor 23, and a fourth front infrared ray sensor 24 that are disposed in a non-display area ND to correspond to each of four corners of a quadrangle of the display area DA.

The first front infrared ray sensor 21, the second front infrared ray sensor 22, the third front infrared ray sensor 23, and the fourth front infrared ray sensor 24 detect a change in amount of infrared rays in the display area DA by triangulation at each corner.

According to triangulation, a first angle $\theta$ of the first front infrared ray sensor 21 and a second angle $\phi$ of the third front infrared ray sensor 23 are measured, as well as a straight line distance line L between the first front infrared ray sensor 21, and the third front infrared ray sensor 23, and the touch position is determined by the first angle $\theta$, the second angle $\phi$, and the straight line distance L. The first angle $\theta$ and the second angle $\phi$ are measured based on a straight line between the first front infrared ray sensor 21 and the third front infrared ray sensor 23.

In this case, a touch position may also be determined by an angle between the first front infrared ray sensor 21 and the second front infrared ray sensor 22, between the third front infrared ray sensor 23 and the fourth front infrared ray sensor 24, or between the second front infrared ray sensor 22 and the fourth front infrared ray sensor 24, by using the triangulation method that is used between the first front infrared ray sensor 21 and the third front infrared ray sensor 23. For one point, because a touch position is determined several times, the touch position can be more accurately determined.

Referring again to FIG. 1, the plasma display device according to the embodiment shown also includes a controller 30. The controller 30 receives a detection signal of a change in amount of applied infrared rays by detection in the front infrared ray sensor 20, and determines a position at which the amount of infrared rays is changed as a touch position.

For example, the controller 30 has position data that are previously set to the display area DA and compares the preset position data with position data in which the amount of detected infrared rays is changed, thereby determining a touch position of the physical solid PS in the display area DA.

The controller 30 may be variously formed by electrical circuits, and therefore a detailed description thereof is omitted. The controller 30 may be provided at any one of the PBAs 17, and in the shown embodiment the controller 30 is provided at the logic board 17d.

An operation of the touch panel is now schematically described. When the plasma display device is operated, visible light and infrared rays are emitted from a front surface of the display area DA (see FIG. 2).

The front infrared ray sensor 20 continues to re-detect infrared rays that are emitted from the front surface of the display area DA. In this case, if a physical solid PS is positioned at the front of the display area DA, an amount of infrared rays having a uniform distribution changes around the physical solid PS and is found by continuous re-detection.

The front infrared ray sensor 20 detects the change in amount of infrared rays through a feedback loop. A detection signal of the change in amount of infrared rays is applied to the controller 30 of the logic board 17d.

The controller 30 compares the preset position data with position data in which an amount of infrared rays is detected as being changed and thus determines a touch position of the physical solid PS in the display area DA.

Figure 7:
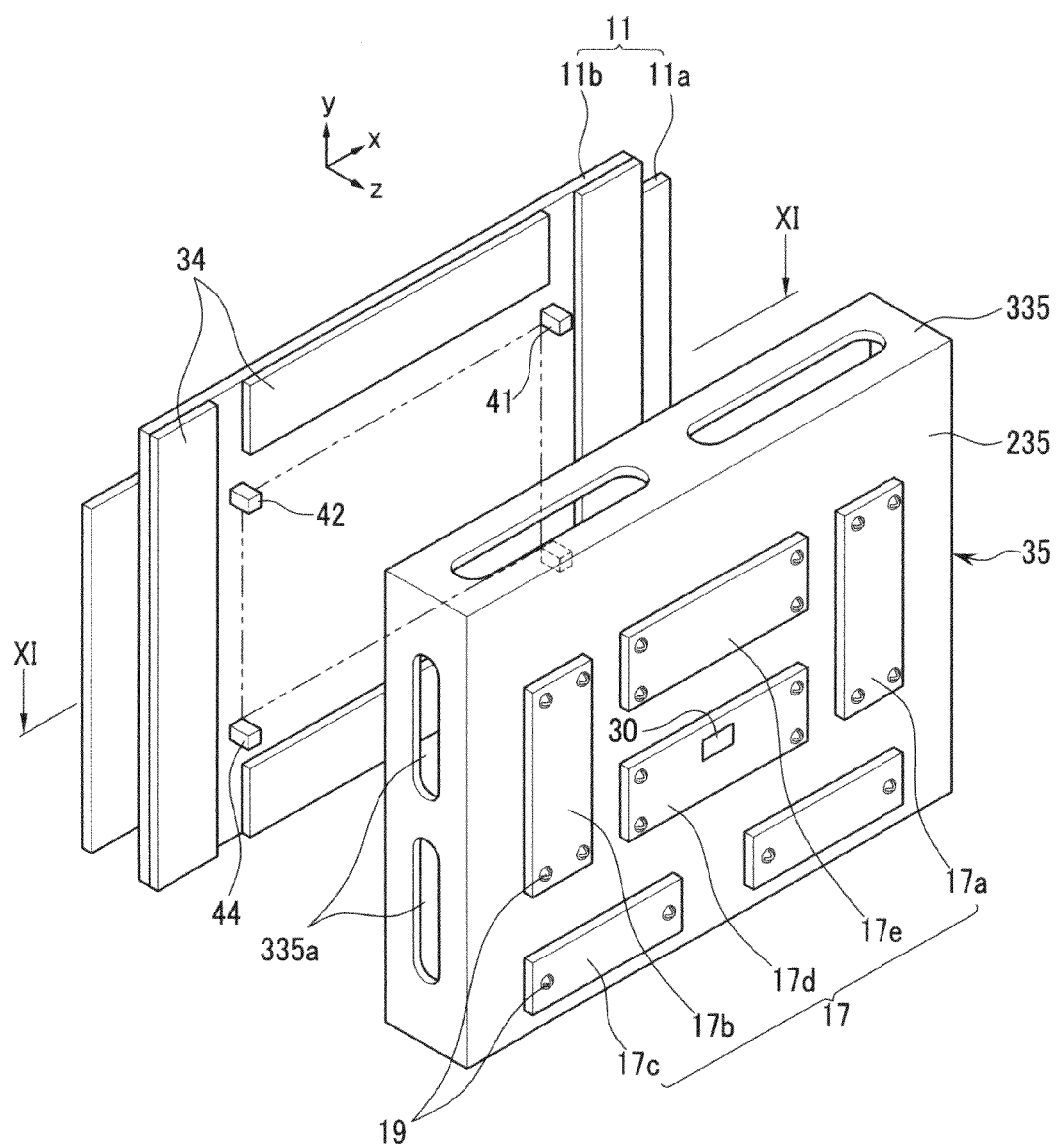
FIG. 7 is an exploded perspective schematic view of a plasma display device according to another embodiment of the present invention.

FIG. 7 is an exploded perspective schematic view of a plasma display device according to another embodiment of the present invention.

When comparing the plasma display device shown in FIG. 7 with the plasma display device of FIG. 1, description of similar features is omitted in order to more clearly describe the differences.

As described above, the plasma display device of FIG. 1 includes the front infrared ray sensor 20 at the front or a front surface of the PDP 11. In contrast, the plasma display device of FIG. 7 includes a rear infrared ray sensor 40 at the rear or a rear surface of the PDP 11 (see FIG. 9).

In the plasma display device of FIG. 1, the front infrared ray sensor 20 detects a change in amount of infrared rays at the front of the PDP 11, and in the plasma display device of FIG. 7, the rear infrared ray sensor 40 detects a change in amount of infrared rays at the rear of the PDP 11.

Therefore, in the plasma display device of FIG. 1, the front infrared ray sensor 20 and the controller 30 detect the change in amount of infrared rays that are emitted from the front surface of the display area DA, thereby determining a touch position of the physical solid PS. In the plasma display device of FIG. 7, the rear infrared ray sensor 40 and the controller 30 detect the change in amount of infrared rays that are reflected from the front surface of the display area DA to the rear surface thereof and that are emitted from the rear surface, thereby determining a touch position of the physical solid PS.

Figure 8:
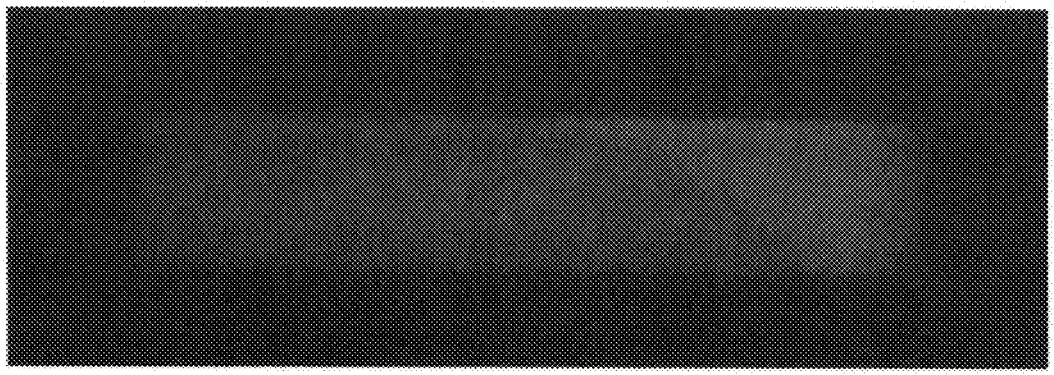
FIG. 8 is a picture illustrating infrared rays that are emitted from a rear side of a PDP of the plasma display device of FIG. 7.

FIG. 8 is a picture illustrating infrared rays that are emitted from the rear side of the PDP 11.

Referring to FIG. 8, it can be seen that infrared rays are emitted (a bright portion of the center) in a uniform distribution manner from the rear surface of the display area DA.

When comparing FIG. 8 with FIG. 6, it can be seen that the amount of infrared rays that are emitted from the rear surface of the display area DA is less than the amount of infrared rays that are emitted from the front surface thereof, but the infrared rays thereof are emitted in a uniform distribution manner.

That is, infrared rays are emitted in a uniform distribution manner from the rear surface of the display area DA. Further, because infrared rays are reflected to the rear by a physical solid PS at the front of the display area DA, infrared rays are emitted from the rear surface of the display area DA. In this case, the amount of infrared rays is changed at a reflected position. By detecting the change in amount of infrared rays, a touch position of the physical solid PS in the display area DA can be detected.

Due to such differences, the plasma display device of FIG. 7 has a different configuration from that of the plasma display device of FIG. 1. As a rear infrared ray sensor 40 is provided in a rear surface of the PDP 11, a chassis base 35 is formed differently from the chassis base 15 described above and shown in FIG. 1.

Figure 9:
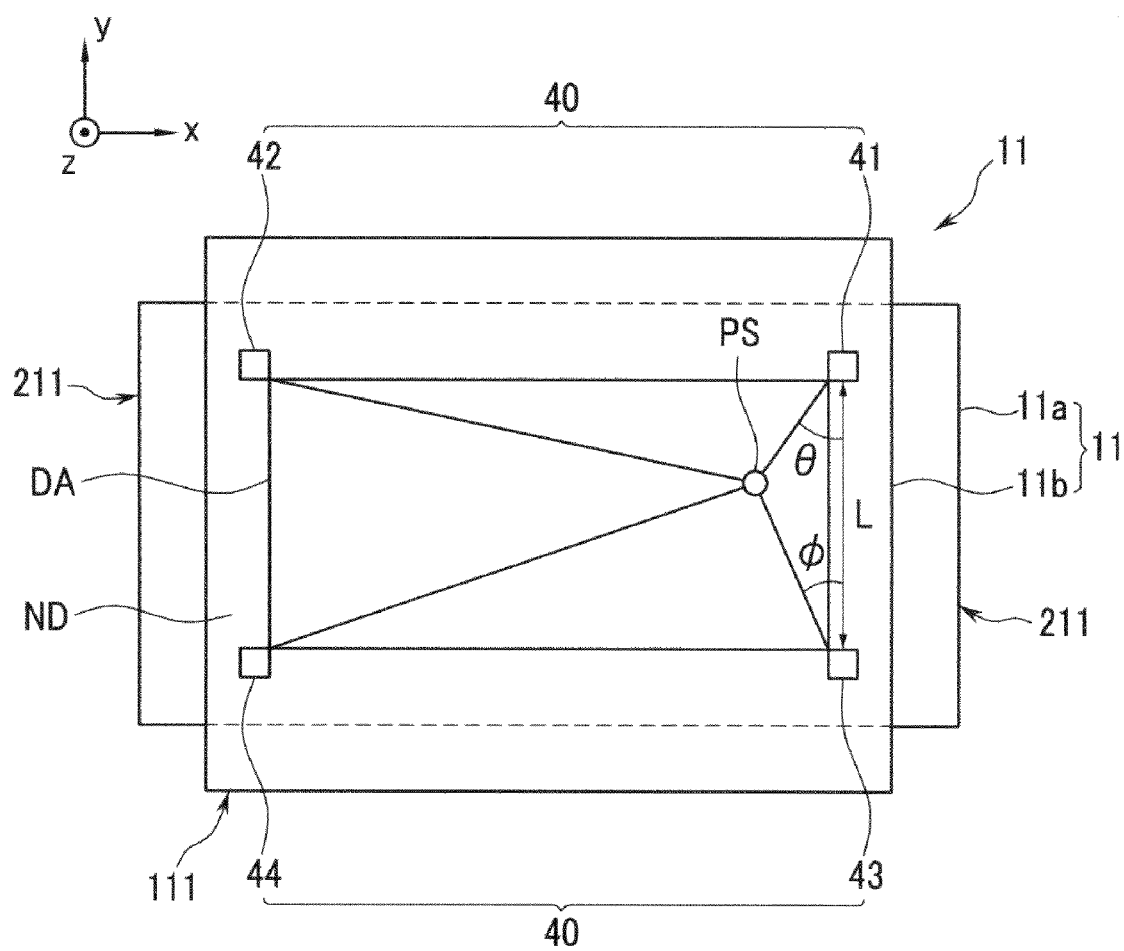
FIG. 9 is a rear schematic view of the PDP of the plasma display device of FIG. 7.

FIG. 9 is a rear schematic view of the PDP 11 of the plasma display device of FIG. 7.

Referring to FIG. 9, the rear infrared ray sensor 40 is attached to a rear surface of the PDP 11. Since the rear infrared ray sensor 40 can detect a change in amount of infrared rays at the rear of the display area DA that are reflected to a rear surface thereof from the physical solid PS at the front of the display area DA to be emitted from the rear surface thereof, the rear infrared ray sensor 40 can be attached to either one of the PDP 11 or the chassis base 35. The quantity of the rear infrared ray sensors 40 may be one, but in the embodiment shown in FIGS. 7 and 9, the quantity of the rear infrared ray sensors 40 is four.

For example, as shown in FIG. 9, in a rear surface of the PDP 11, the rear infrared ray sensor 40 includes a first rear infrared ray sensor 41, a second rear infrared ray sensor 42, a third rear infrared ray sensor 43, and a fourth rear infrared ray sensor 44 that are disposed in a non-display area ND to correspond to each of four corners of a quadrangle of the display area DA.

The first rear infrared ray sensor 41, the second rear infrared ray sensor 42, the third rear infrared ray sensor 43, and the fourth rear infrared ray sensor 44 detect a change in amount of infrared rays in the display area DA by triangulation at each corner.

According to triangulation, a first angle $\theta$ of the first rear infrared ray sensor 41 and a second angle $\phi$ of the third rear infrared ray sensor 43 are measured, as well as a straight line distance L between the first rear infrared ray sensor 41 and the third rear infrared ray sensor 43, and the touch position is determined by the first angle $\theta$, the second angle $\phi$, and the straight line distance L. The first angle $\theta$ and the second angle $\phi$ are measured based on a straight line between the first rear infrared ray sensor 41 and the third rear infrared ray sensor 43.

In this case, a touch position may also be determined by an angle between the first rear infrared ray sensor 41 and the second rear infrared ray sensor 42, between the third rear infrared ray sensor 43 and the fourth rear infrared ray sensor 44, or between the second rear infrared ray sensor 42 and the fourth rear infrared ray sensor 44, by using the method that is used between the first rear infrared ray sensor 41 and the third rear infrared ray sensor 43. For one point, because the touch position is determined several times, the touch position can be more accurately determined.

The controller 30 receives a detection signal of the change in amount of applied infrared rays that are detected by the rear infrared ray sensor 40 and determines a position at which the amount of infrared rays are changed as a touch position of the physical solid PS.

For example, the controller 30 has position data that are previously set to the display area DA and compares the preset position data with position data in which the amount of the detected infrared rays is changed, thereby determining a touch position of the physical solid PS in the display area DA.

Figure 11:
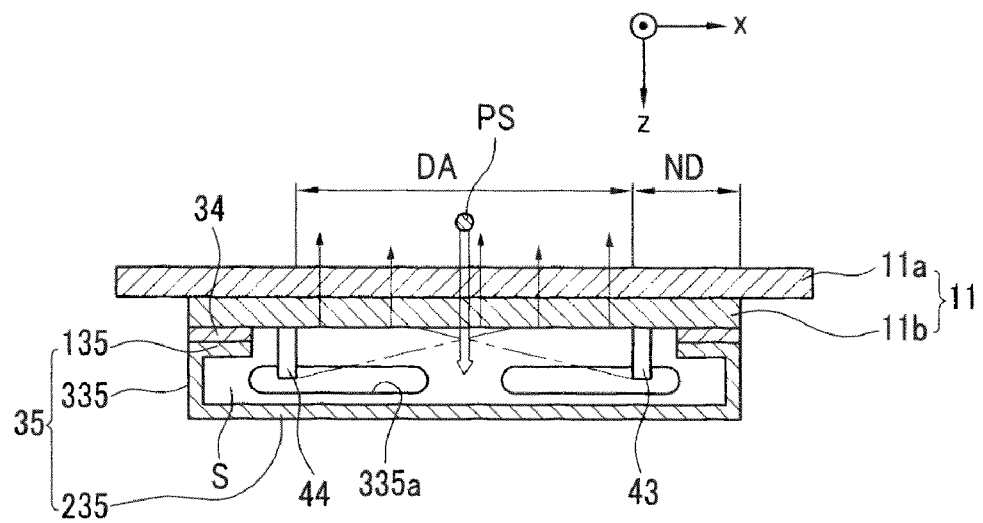
FIG. 11 is a cross-sectional schematic view of the plasma display device taken along line XI-XI of FIG. 7.

The chassis base 35 provides a space S that can house the rear infrared ray sensor 40 between the PDP 11 and the chassis base 35 for detecting the change in amount of infrared rays (see FIG. 11).

Figure 10:
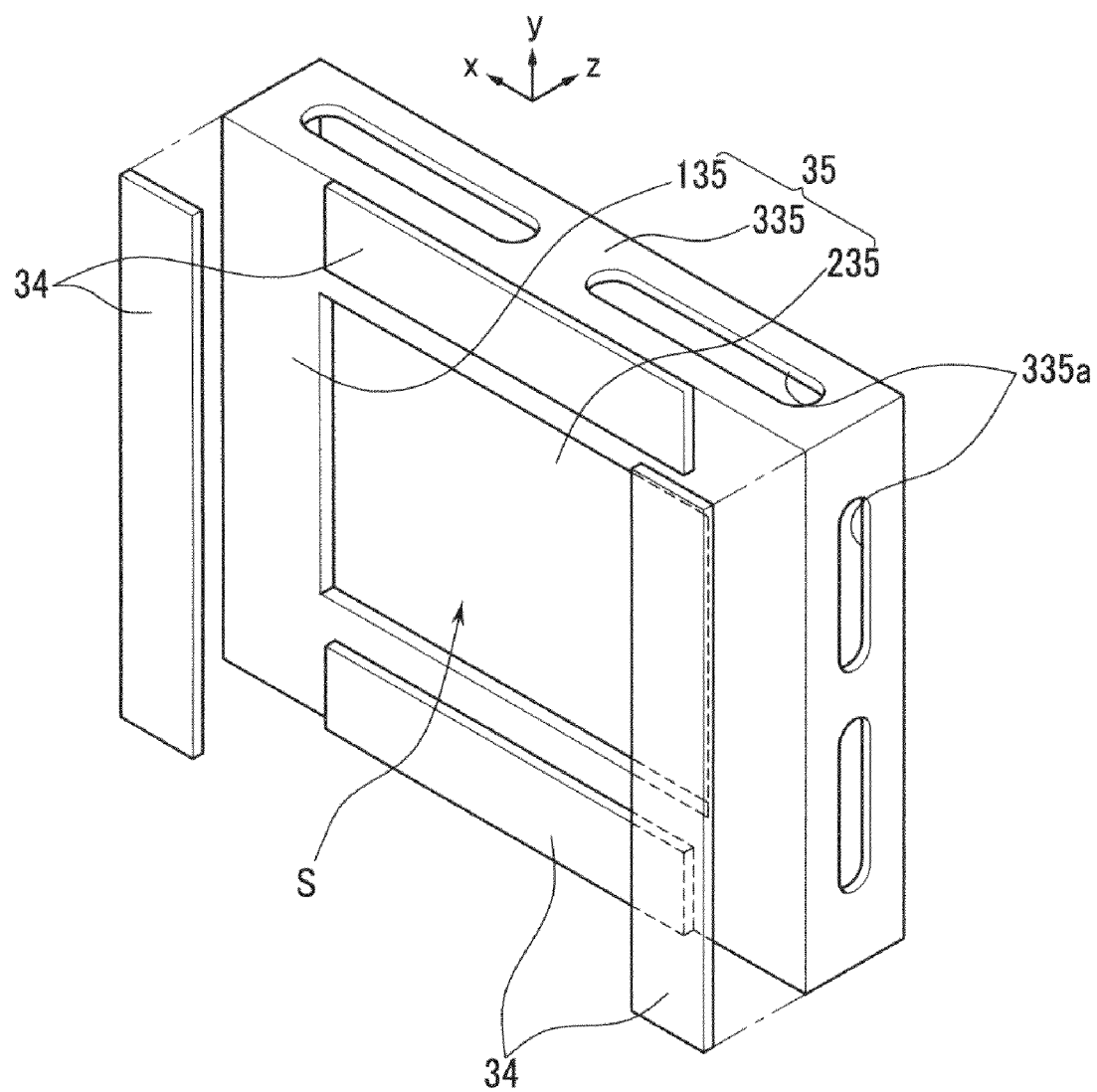
FIG. 10 is a perspective schematic view of a chassis base of the plasma display device of FIG. 7.

FIG. 10 is a perspective schematic view of the chassis base 35.

For convenience of description, the PDP 11 has a quadrangle shape including a pair of longitudinal sides 111 that are opposite to each other and a pair of lateral sides 211 that are orthogonal to the longitudinal side 111 and that are opposite to each other (see FIG. 9).

Referring to FIG. 10, the chassis base 35 includes a first horizontal member 135, a second horizontal member 235, and a vertical member 335.

The first horizontal member 135 is opposite to the pair of longitudinal sides 111 and the pair of lateral sides 211 to be attached to the PDP 11. The first horizontal member 135 is formed in a quadrangular frame to be attached to the area of the PDP 11 including the longitudinal sides 111 and the lateral sides 211.

In the plasma display device of FIG. 7, due to the space S, an attachment area of the chassis base 35 for attaching the PDP 11 is more limited than that of the plasma display device of FIG. 1. As a result, the first horizontal member 135 has a maximum attaching area.

A double-sided adhesive tape 34 is interposed between the chassis base 35 and the PDP 11 to attach them. That is, the double-sided adhesive tape 34 is adhered to each of the first horizontal member 135 and the pair of longitudinal sides 111 that are opposite to each other and also to each of the first horizontal member 135 and the pair of lateral sides 211 that are opposite to each other.

FIG. 11 is a cross-sectional schematic view of the plasma display device of FIG. 7 taken along line XI-XI.

Referring to FIGS. 10 and 11, the second horizontal member 235 provides a mounting space of the PBAs 17, as in the chassis base 15 of the plasma display device of FIG. 1.

The vertical member 335 is bent to an opposite side of the PDP 11 from the first horizontal member 135 to be connected to the second horizontal member 235. That is, the chassis base 35 sets the space S between the first horizontal member 135 and the second horizontal member 235 according to a size of the vertical member 335.

As the first horizontal member 135 is attached to the PDP 11, heat that is generated in the PDP 11 is emitted to the space S between a rear surface of the PDP 11 and the second horizontal member 235 that is opposite thereto.

The vertical member 335 has at least one vent hole 335a. The vent hole 335a connects the space S between the PDP 11 and the second horizontal member 235 to the outside of the chassis base 35. The at least one vent hole 335a emits heat from the space S by air flow to the outside of the chassis base 35.

The front and rear infrared ray sensors 20 and 40 (refer to FIGS. 3 and 9) of the plasma display devices of FIGS. 1 and 7, respectively, detect the change in amount of infrared rays that are emitted from a front surface and a rear surface of the display area DA.

However, the front and rear infrared ray sensors 20 and 40 can be replaced with other elements, such as an infrared ray camera, for example, as long as the change in amount of infrared rays can be recognized. An infrared ray camera may be provided at the same position as that of either the front or rear infrared ray sensors 20 and 40.

Figure 12:
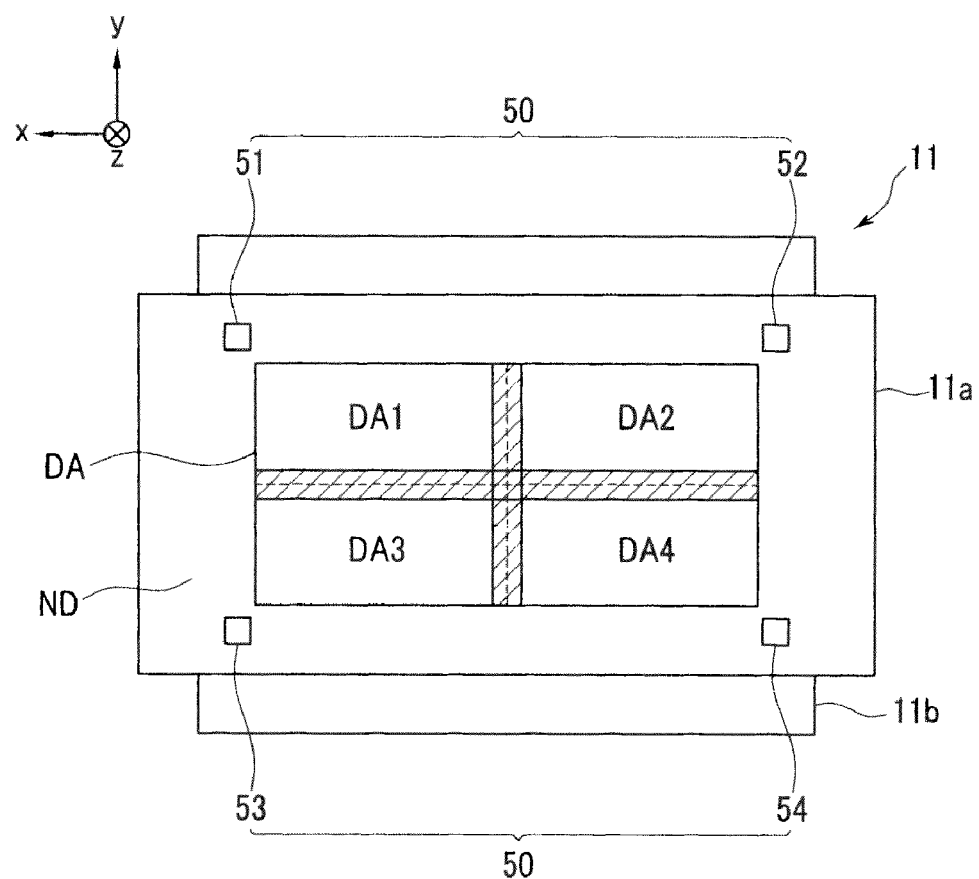
FIG. 12 is a front schematic view of a PDP of a plasma display device according to yet another embodiment of the present invention.

FIG. 12 is a front schematic view of a PDP in a plasma display device according to another embodiment of the present invention.

Referring to FIG. 12, an infrared ray camera 50 photographs the change in amount of infrared rays that are emitted from the PDP and communicates a photographing signal representing the change in amount of infrared rays to the controller 30 or the PBA 17.

The infrared ray camera 50 may be provided at the front or a front surface of the PDP 11, and in this case the infrared ray camera 50 photographs infrared rays of a wavelength range of 800-1000 nm that are emitted from the front surface. The controller 30 determines a touch position of a physical solid PS with a detection signal of the change in amount of infrared rays in a front surface of a display area DA.

Further, the infrared ray camera 50 may be provided at the rear or a rear surface of the PDP 11, and in this case the infrared ray camera 50 photographs infrared rays of a wavelength range of 800-1000 nm that are emitted from the rear surface by being reflected from the front surface to the rear surface.

In this case, the infrared ray camera 50 photographs infrared rays of a wavelength range of 800-1000 nm that are emitted from the rear surface of the PDP 11. Infrared rays that are directly emitted from the rear surface are uniformly emitted regardless of the change in amount of infrared rays that are reflected from the front surface to the rear surface. The controller 30 determines a touch position of a physical solid PS with a detection signal of the change in amount of infrared rays in the rear surface of the display area DA.

For convenience of description, the display area DA may be partitioned into first, second, third, and fourth detection areas DA1, DA2, DA3, and DA4, each of which respectively occupies one quarter or more of the display area DA at the corners. A first infrared ray camera 51 detects the first detection area DA1 of a corner, a second infrared ray camera 52 detects the second detection area DA2 of another corner, a third infrared ray camera 53 detects the third detection area DA3 of another corner, and a fourth infrared ray camera 54 detects the fourth detection area DA4 of the remaining corner.

Because the first, second, third, and fourth detection areas DA1, DA2, DA3, and DA4 are partially overlapped with neighboring detection areas, a change in amount of infrared rays can be detected in the entire display area DA.

Figure 13:
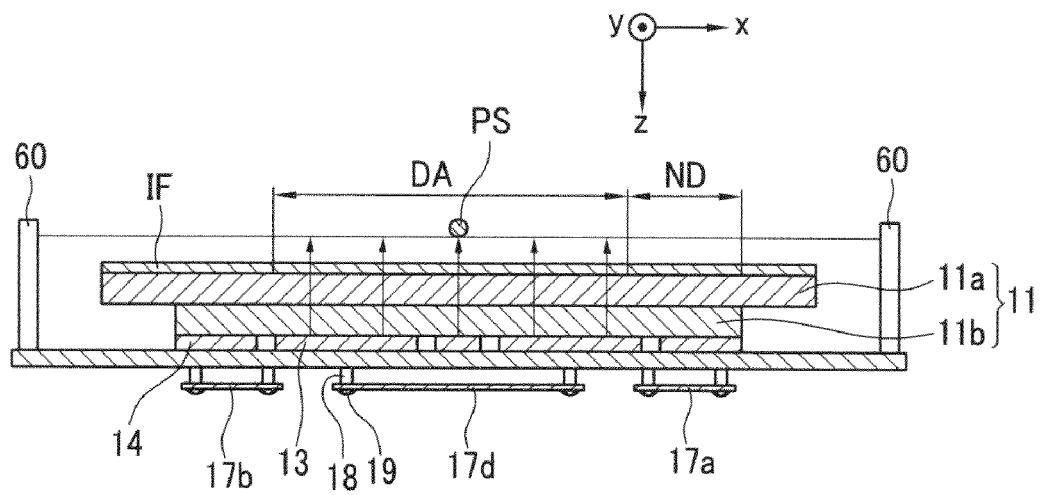
FIG. 13 is a cross-sectional schematic view of a plasma display device according to still another embodiment of the present invention.

FIG. 13 is a cross-sectional schematic view of a plasma display device according to another embodiment of the present invention.

When comparing the plasma display device of FIG. 13 with those of FIGS. 1, 7, and 12, description of similar portions is omitted so that differing features may be more clearly described.

Referring to FIG. 13, the plasma display device according to the depicted embodiment includes a detector 60 at a side surface of the PDP 11. The detector 60 detects the change in amount of infrared rays that are emitted from the front or the rear at the side surface of the PDP 11.

In the plasma display devices of FIGS. 1 and 7, front and rear infrared ray sensors 20 and 40 are used, respectively, and in the plasma display device of FIG. 12, the infrared ray camera 50 is used. However, in the plasma display device of FIG. 13, the detector 60 is used. The detector 60 may include the front and rear infrared ray sensors 20 and 40, the infrared ray camera 50, and a device for detecting a change in amount of infrared rays.

Further, in the plasma display devices of FIGS. 1, 7, and 12, the change in amount of infrared rays in a front surface or a rear surface of the PDP 11 is detected, but in the plasma display device of FIG. 13, the change in amount of infrared rays in a side surface of the PDP 11 is detected.

Methods that are described above with respect to the plasma display devices of FIGS. 1, 7, and 12 can be applied to a method of determining a touch position by detecting the change in amount of infrared rays using the detector 60.

Figure 14:
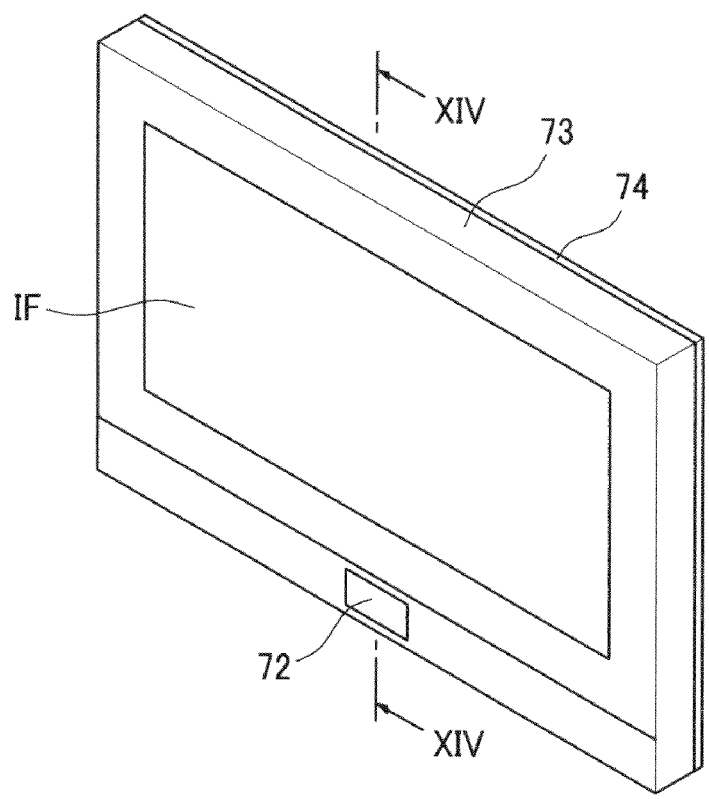
FIG. 14 is a perspective schematic view of a plasma display device according to still another embodiment of the present invention.
Figure 15:
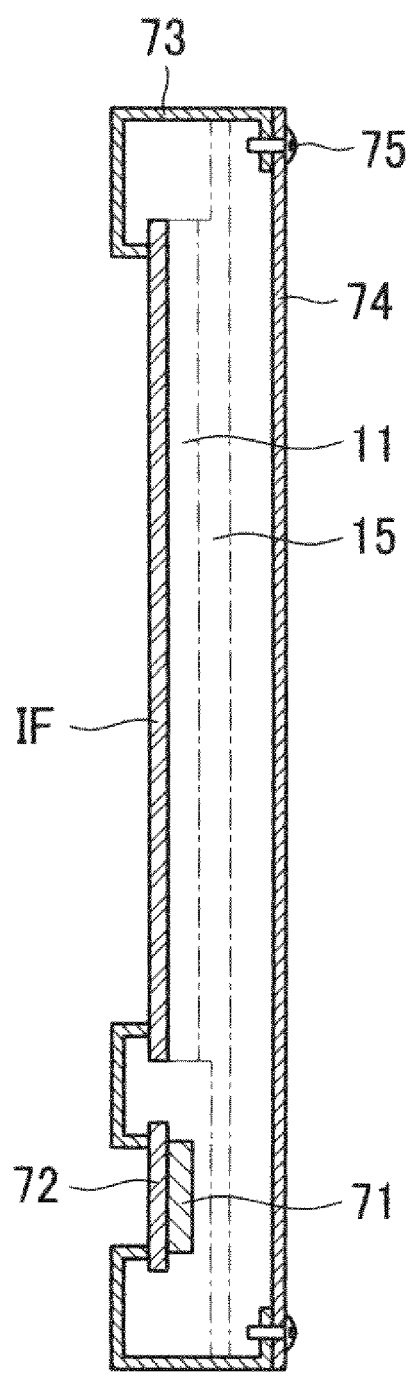
FIG. 15 is a cross-sectional schematic view of the plasma display device taken along line XIV-XIV of FIG. 14.

FIG. 14 is a perspective schematic view of a plasma display device according to another embodiment of the present invention, and FIG. 15 is a cross-sectional schematic view of the plasma display device of FIG. 14 taken along line XIV-XIV.

Referring to FIGS. 14 and 15, the plasma display device according to the depicted embodiment further includes a light receiving sensor 71 and a light receiving sensor filter 72.

In the plasma display device of FIGS. 14 and 15, an infrared ray passage filter IF is used. As described above, the infrared ray passage filter IF transmits infrared rays having a wavelength range of 800-1000 nm and shields infrared rays having other wavelength ranges among infrared rays that are emitted from the PDP 11.

Therefore, when the infrared ray passage filter IF is used, because infrared rays having a wavelength range of 800-1000 nm that pass through the infrared ray passage filter IF are overlapped with infrared rays of a wavelength range of 900-950 nm that are radiated from a remote control to the light receiving sensor 71, an erroneous operation of the remote control may occur.

The light receiving sensor filter 72 is provided at the front of the light receiving sensor 71 to permit passage of infrared rays of a wavelength range of 900-950 nm that are radiated from the remote control and to shield infrared rays of the remaining wavelength range.

Further, because the light receiving sensor filter 72 permits passage of infrared rays of a wavelength range of 900-950 nm, it is preferable that the infrared ray passage filter IF increases a shield rate of infrared rays of a wavelength range of 900-950 nm that are radiated from the remote control while transmitting infrared rays of a wavelength range of 800-1000 nm.

In the plasma display device, the light receiving sensor 71 and the light receiving sensor filter 72 may be provided and formed at various positions in various structures.

For example, as shown in FIGS. 14 and 15, the plasma display device includes a front case 73 and a rear case 74 that cover the front of the PDP 11 and the rear of chassis base 15, respectively. The front case 73 and the rear case 74 are fastened by a fastening member 75.

The light receiving sensor 71 is disposed at an outer region of the PDP 11 at the inside of the front case 73. Therefore, the light receiving sensor filter 72 is disposed at the front of the light receiving sensor 71 to be provided at the inside of the front case 73.

The light receiving sensor filter 72 may be a phosphate glass filter including dihydric copper ions, a filter in which a thin layer of metal is formed on a glass surface, and/or a filter formed of a resin including a pigment.

For example, the filter in which a thin layer of metal is formed on a glass surface may be formed by a method of depositing, sputtering, and/or ion plating a thin layer of silver (Ag) on the glass surface.

In a plasma display device according to an exemplary embodiment of the present invention, by providing an infrared ray sensor or an infrared ray camera at a surface of the PDP, a touch position can be determined with a change in amount of infrared rays that are detected in a front surface or a rear surface of the PDP. That is, a touch panel may be embodied in the plasma display device.

Further, because a plasma display device according to an exemplary embodiment of the present invention utilizes infrared rays that are emitted in a uniform distribution manner from a PDP, a separate infrared ray source is not required and a size of the plasma display device may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A plasma display device comprising:
a plasma display panel (PDP) for displaying an image;
a chassis base attached to and supporting the PDP;
an infrared ray sensor at a front surface or a rear surface of the PDP for detecting a change in amount of infrared rays emitted from the PDP, the front surface and the rear surface of the PDP not including a separate infrared ray emitter for transmitting infrared rays to the infrared ray sensor; and
a controller for receiving a detection signal and determining a position of the change in amount of infrared rays, the position of the change in amount of infrared rays defining a touch position.

2. The plasma display device of claim 1, wherein the infrared ray sensor includes a front infrared ray sensor at the front surface of the PDP.

3. The plasma display device of claim 2, wherein the PDP comprises:
a display area for displaying the image; and
a non-display area at a periphery of the display area,
wherein the front infrared ray sensor comprises a first front infrared ray sensor, a second front infrared ray sensor, a third front infrared ray sensor, and a fourth front infrared ray sensor in the non-display area corresponding to each of four corners of a quadrangle of the display area.

4. The plasma display device of claim 1, wherein the infrared ray sensor includes a rear infrared ray sensor at the rear surface of the PDP.

5. The plasma display device of claim 4, wherein the PDP comprises:
a display area for displaying the image; and
a non-display area at a periphery of the display area,
wherein the rear infrared ray sensor comprises a first rear infrared ray sensor, a second rear infrared ray sensor, a third rear infrared ray sensor, and a fourth rear infrared ray sensor in the non-display area corresponding to each of four corners of a quadrangle of the display area.

6. The plasma display device of claim 1, further comprising a printed circuit board assembly (PBA) at a rear surface of the chassis base and electrically coupled to the PDP,
wherein the PBA comprises the controller.

7. The plasma display device of claim 1, wherein the PDP comprises:
a pair of longitudinal sides opposite each other and a pair of lateral sides orthogonal to the longitudinal sides and opposite each other,
wherein the chassis base comprises:
a first horizontal member attached to the PDP and facing the pair of longitudinal sides and the pair of lateral sides;
a vertical member attached to the first horizontal member and extending away from the PDP; and a second horizontal member attached to the vertical member and substantially parallel to the first horizontal member.

8. The plasma display device of claim 7, wherein the first horizontal member is a frame having a quadrangular shape corresponding to the pair of longitudinal sides and the pair of lateral sides.

9. The plasma display device of claim 8, further comprising a double-sided adhesive tape between the PDP and the first horizontal member.

10. The plasma display device of claim 7, wherein the vertical member comprises a vent hole for venting air from a space between the rear surface of the PDP and the second horizontal member.

11. A plasma display device comprising:
a plasma display panel (PDP) for displaying an image;
a chassis base attached to and supporting the PDP;
an infrared ray camera at a front surface or a rear surface of the PDP for photographing a change in amount of infrared rays emitted from the PDP, the front surface and the rear surface of the PDP not including a separate infrared ray emitter for transmitting infrared rays to the infrared ray camera; and
a controller or a printed circuit board assembly (PBA) for receiving a photograph signal and determining a position of the change in amount of infrared rays, the position of the change in amount of infrared rays defining a touch position.

12. The plasma display device of claim 11, wherein the infrared ray camera is at the front surface of the PDP, and
infrared rays emitted from the front surface of the PDP have a wavelength range from about 800 nm to about 1000 nm.

13. The plasma display device of claim 11, wherein the infrared ray camera is at the rear surface of the PDP, and
the infrared rays are reflected from the front surface of the PDP to the rear surface and have a wavelength range from about 800 nm to about 1000 nm when they are emitted from the rear surface.

14. The plasma display device of claim 11, wherein the PDP comprises:
a display area for displaying the image; and
a non-display area at a periphery of the display area,
wherein the infrared ray camera comprises a first infrared ray camera, a second infrared ray camera, a third infrared ray camera, and a fourth infrared ray camera in the non-display area corresponding to each of four corners of a quadrangle of the display area.

15. The plasma display device of claim 14, wherein the first, second, third, and fourth infrared ray cameras have a first detection area, a second detection area, a third detection area, and a fourth detection area, respectively, each of the detection areas occupying at least one quarter of the display area at each of the corners.

16. The plasma display device of claim 15, wherein at least one of the first, second, third, and fourth detection areas overlaps another of the first, second, third, and fourth detection areas.

17. The plasma display device of claim 15, wherein the first, second, third, and fourth infrared ray cameras detect a change in amount of infrared rays emitted from the front surface of the PDP corresponding to the first, second, third, and fourth detection areas, respectively.

18. A plasma display device comprising:
a plasma display panel (PDP) for displaying an image;
a chassis base attached to and supporting the PDP;
a detector at a front surface, a rear surface, or a side surface of the PDP for detecting a change in amount of infrared rays emitted from the PDP, the front surface, the rear surface, and the side surface of the PDP not including a separate infrared ray emitter for transmitting infrared rays to the detector; and
a controller for receiving a detection signal from the detector and determining a position of the change in amount of infrared rays, the position of the change in amount of infrared rays defining a touch position.

19. The plasma display device of claim 18, wherein the detector comprises at least one of an infrared ray sensor or an infrared ray camera.

20. The plasma display device of claim 19, wherein the at least one of the infrared ray sensor or the infrared ray camera comprises a feedback loop that re-detects infrared rays emitted from the PDP.

21. The plasma display device of claim 18, wherein the detector includes at least two detectors for determining the position using two intersecting shafts.

22. The plasma display device of claim 18, further comprising an infrared ray passage filter for transmitting a wavelength range from about 800 nm to about 1000 nm of infrared rays emitted from the PDP.

23. The plasma display device of claim 22, further comprising a light receiving sensor for detecting infrared rays radiated from a remote control controlling the PDP, and
a light receiving sensor filter for transmitting a wavelength range from about 900 nm to about 950 nm of infrared rays radiated from the remote control and for shielding other wavelength ranges among a wavelength range from about 800 nm to about 1000 nm of the infrared rays.

24. The plasma display device of claim 23, further comprising a front case covering a side of the PDP and a rear case covering a side of the chassis base, the front case and the rear case coupled to each other,
wherein the light receiving sensor is at the inside of the front case at an outer region of the PDP, and
the light receiving sensor filter is at the front of the light receiving sensor.

25. The plasma display device of claim 23, wherein the light receiving sensor filter is a phosphate glass filter including dihydric copper ions, a filter including a thin layer of metal on a glass surface, or a filter including a resin having a pigment.

* * * * *